Feb. 3, 1948.  W. L. ODEN  2,435,459
AIRPLANE LANDING GEAR
Filed Feb. 19, 1943  3 Sheets—Sheet 2
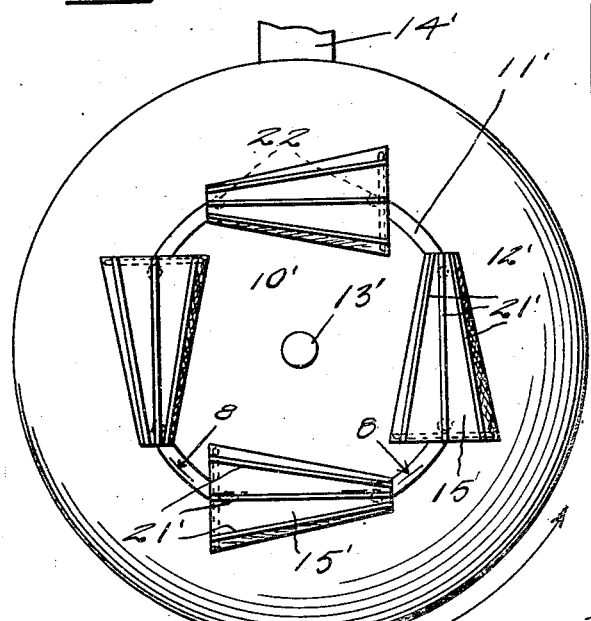
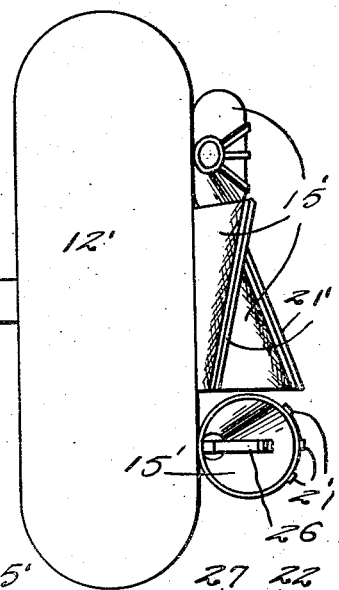
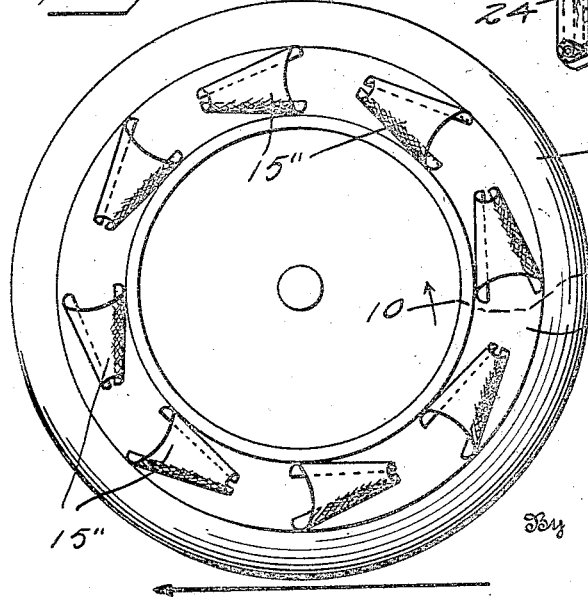
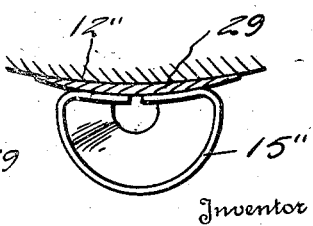
Inventor
W. L. Oden
By L. F. Randolph
Attorney Feb. 3, 1948.  W. L. ODEN  2,435,459
AIRPLANE LANDING GEAR
Filed Feb. 19, 1943  3 Sheets-Sheet 3
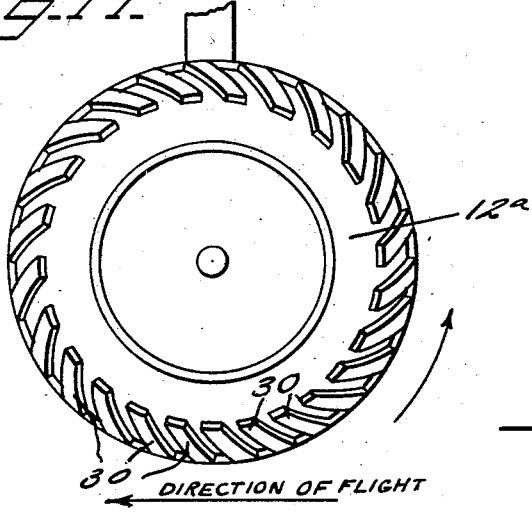
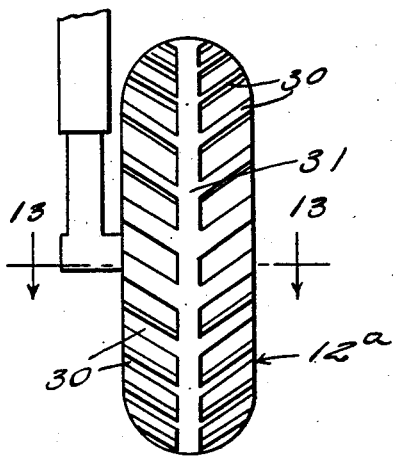
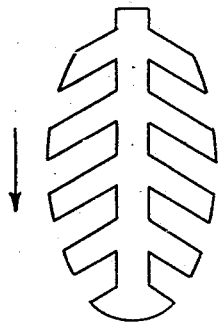
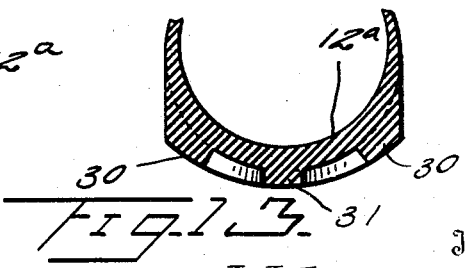
Inventor
W. L. Oden
By L. F. Randolph
Attorney Patented Feb. 3, 1948

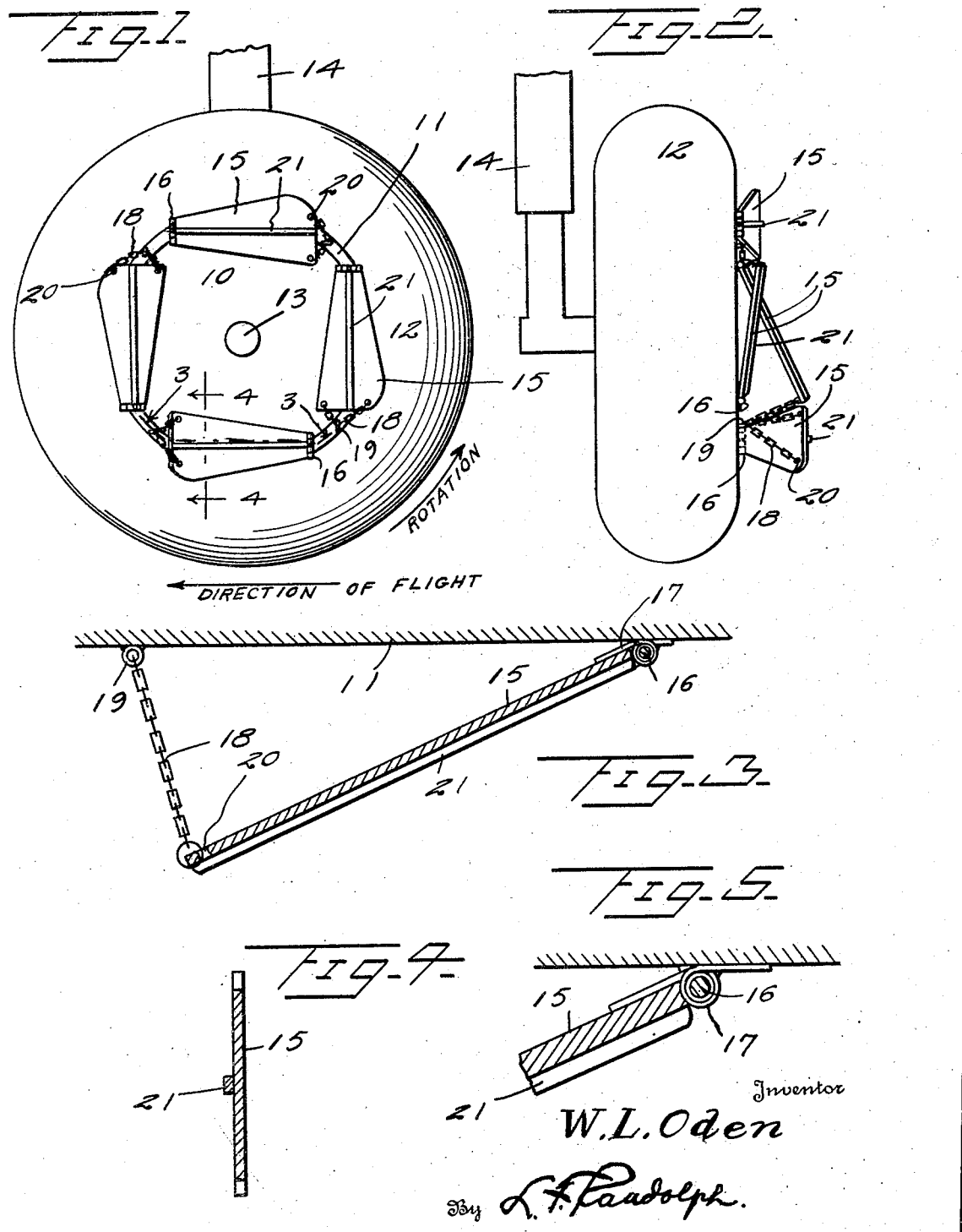

2,435,459

UNITED STATES PATENT OFFICE 2,435,459

AIRPLANE LANDING GEAR

William L. Oden, Nashville, Tenn.

Application February 19, 1943, Serial No. 476,438

3 Claims. (Cl. 244—103)

This invention relates to airplane landing gear and specifically to the pneumatic tires thereof.

It is particularly aimed to provide a means which will, without the application of extraneous power, cause the wheels of the landing gear to rotate in forward direction at approximately the landing ground speed of the particular airplane on which the invention is used in order to prevent the usual skidding of the wheels and tires when contact is made with the runway surface, thereby to avoid the excessive wear occasioned by such skidding, in order to prolong the life of the tires.

It also is aimed to provide constructions whereby the means which cause the rotation of the wheels or tires is collapsible but which readily will extend or expand when the wheels are projected.

The more specific objects and advantages will become apparent from a consideration of the description following taken in connection with accompanying drawings illustrating an operative embodiment.

In said drawings:

Figure 1 is a view in side elevation of a wheel and tire embodying one form of my invention;

Figure 2 is an elevation of the parts of Figure 1 taken at a right angle thereto;

Figure 3 is a longitudinal section taken on the line 3—3 of Figure 1;

Figure 4 is a transverse section taken on the line 4—4 of Figure 1;

Figure 5 is a view taken on the same plane as Figure 3 but on a slightly larger scale better to show the spring hinge;

Figure 6 is a side elevation of a second form of wheel and tire carrying out the invention;

Figure 7 is an edge elevation of the parts of Figure 6;

Figure 8 is a section taken on the line 8—8 of Figure 6;

Figure 9 is a side elevation of a third form of the invention showing a tire and wheel;

Figure 10 is a cross section taken on the line 10—10 of Figure 9;

Figure 11 is a side elevation of a final form of the invention;

Figure 12 is an edge view of the structure of Figure 11;

Figure 13 is a cross section taken on the line 13—13 of Figure 12; and

Figure 14 is a plan view suggesting the ground marking made by the tire of Figure 11.

Referring specifically to the drawings and first to the form of Figures 1 to 5, 10 represents a conventional airplane wheel having a rim at 11 upon which a pneumatic tire 12 of conventional form is demountably carried. Wheel 10 is journaled on an axle 13 of a bracket 14 and is of conventional construction operable to retract the wheel and tire within the wing, motor nacelle, fuselage or the like, of the airplane, and to project the same therefrom to operative position in the air stream.

Any suitable number of vanes or the like 15 of wood or any other suitable material are equidistantly spaced around the rim 11, being smaller at one end than at the other, and at the smaller end being hinged to such rim by hinges 16. Said hinges 16 include spring 17 which urge the vanes 15 at their larger ends away from rim 11, to the extent permitted by flexible elements such as chains 18 fastened to eyelets 19 in rim 11 and in openings 20 provided in the larger ends of the vanes 15.

Along the exterior face of the vanes 15 and preferably centrally and longitudinally thereof are strips 21 of wood, light metal, or the equivalent. These strips protect and reinforce the vanes 15 and they take up any rubbing or wear occasioned in manipulating the wheels into and out of their recesses in the airplane wing, motor nacelle, fuselage, or the like.

As a result of the construction described, when the wheels of the airplane equipped with my improvement are retracted within their recesses in the wings, motor nacelle, fuselage, or the like, the vanes 15 are collapsed flat against the same, but when the wheels are projected from such recesses into the air stream preparatory to landing, the springs 17 project the vanes 15 outwardly at their large ends so that the flaps or vanes 15 will offer resistance to the air at or near the bottom of the wheel while the vanes at or near the top of the wheel swing in and offer much less resistance to such air. Due to this unbalanced condition, the forces at the bottom and top of the wheel cause the wheel to rotate in a counterclockwise direction when the airplane is travelling forwardly. Rotation of the wheel is proportional to air speed, and the vanes are so adjusted that the wheel will spin at such a speed that when an average normal landing is made the tire will not skid along the surface of the runway as is normally the case, and the tire accordingly will be of much greater life.

Various forms may be resorted to in carrying out the invention. For instance, I may use that disclosed in Figures 6 to 8. In such form the wheel 10', rim 11', tire 12', axle 13' and bracket 14' correspond to the parts 10, 11, 12, 13, and 14 of the preceding form. In lieu of the vanes 15 I employ vanes 15' preferably of flexible material like textile fabric so as to be collapsible, and generally of conical form when distended as shown in the drawings. These vanes or socks 15' are open at both ends and normally collapse within the recesses into which they are retracted. They are fastened as by bolts 22 to the rim 11' and they have one or more longitudinally extending wooden or metallic strips 21' which function like those at 21. At the larger end each vane or sock 15' has an endless spring or other cable 23 secured therein by an inturned edge portion 24 stitched in place at 25. The cable or ring 23 will collapse with the sock but will expand when free into the position of Figure 8. Also, to prevent backward collapse of the vanes or socks 15', they have metallic bars or braces 26 within the same hinged as at 27 to one of the bolts 22 and at 28 to one of the strips 21'.

Another form is shown in Figure 9 functioning like that of the preceding forms. This form utilizes any desired number of the fabric or other collapsible conical open-ended socks or vanes 15", substantially like those of 15'. These socks are fastened in any suitable manner to one side of the tire 12" but they preferably are fastened by vulcanizing them to a single strip or band 29 of endless form, being for instance of a rubberized fabric which in turn is vulcanized directly to a side of the tire as shown.

The further modified form of the invention shown in Figures 11, 12, 13, will accomplish the same result as that of the preceding form. In this form the pneumatic tire 12a has on the tread thereof as part of the rubber of its shoe reversed angularly arranged bars extending from and on opposite sides of a central bar or rib 31 extending peripherally of the tire. Such bars 30 in effect form V's and V recesses between the same. Such bars and recesses present a series of concave sections causing high air resistance in the air stream at the bottom of the wheel, while the tread sections at the top of the wheel face in the opposite direction and present a convex face to the wind (low air resistance). The unbalanced forces of high air resistance against the tread at the bottom of the tire and low air resistance at the top of the tire cause the tire to rotate in the desired forward direction. The strip or rib 31 ties the sections together and mutually strengthens each other against ground forces developed when brakes are applied. If such sections or bars 30 were not connected together, allowing them to help support each other against tangential forces on the tire by ground reaction, rapid tread wear would result.

The tread of Figures 11 to 13 also will serve as an anti-skid tread and will produce a mark on the ground of the shape illustrated in Figure 14.

I claim as my invention:

1. An airplane wheel comprising a wheel annulus, a plurality of pivotal plates in a circular arrangement on one side of the wheel annulus, and a spring at the point of pivotal connection of each plate to cause the opposite end of such plate to move away from the side of the wheel, said spring acting independently of, and in addition to, any air pressure which might be imposed upon such plate, and means for preventing excessive outward movement of the plates in their pivotal action in response to air pressure and the action of the spring.

2. In combination, a wheel including a rim and a tire on the rim; a plurality of annularly arranged plates, each hinged at one end to the rim, and provided with means to effect positive movement of the opposite end of such plate away from the side of the wheel, said means acting independently of, and in addition to, any air pressure which might be imposed upon such plates, each of said plates being of flaring formation from their hinged ends toward their free ends.

3. In combination, a wheel including a rim and a tire on the rim; a plurality of annularly arranged vane-like members, each secured to the rim and a spring operatively positioned relative to each member and the rim to effect positive movement of an end of such members away from the side of the wheel, said means acting independently of, and in addition to, any air pressure which might be imposed upon such members.

WILLIAM L. ODEN.

REFERENCES CITED

The following references are of record in the file of this patent:

UNITED STATES PATENTS

| Number | Name | Date |
|---|---|---|
| 671,378 | Hessler | Apr. 2, 1901 |
| 1,114,466 | Goodenberger | Oct. 20, 1914 |
| 193,954 | Hodges | Aug. 7, 1877 |
| 1,833,019 | Faucher | Nov. 24, 1931 |
| 2,305,237 | Carpenter | Dec. 15, 1942 |
| 2,312,159 | Gulotta | Feb. 23, 1943 |
| 2,333,447 | Schippel | Nov. 2, 1943 |
| 257,210 | Casterline | May 2, 1882 |
| 1,225,181 | Schleicher | May 8, 1917 |

FOREIGN PATENTS

| Number | Country | Date |
|---|---|---|
| 516,738 | Great Britain | Jan. 10, 1940 |
| 14,914 | Great Britain | 1896 |